United States Patent
Shirouzu (12)

(10) Patent No.: US 11,585,422 B2
(45) Date of Patent: Feb. 21, 2023

(54) BENDING MESHING TYPE GEAR DEVICE

(71) Applicant: SUMITOMO HEAVY INDUSTRIES, LTD., Tokyo (JP)

(72) Inventor: Kenji Shirouzu, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 167 days.

(21) Appl. No.: 17/082,684

(22) Filed: Oct. 28, 2020

(65) Prior Publication Data

US 2021/0123515 A1 Apr. 29, 2021

(30) Foreign Application Priority Data

Oct. 28, 2019 (JP) .............................. JP2019-194964

(51) Int. Cl.
 *F16H 49/00* (2006.01)
 *F16H 57/08* (2006.01)

(52) U.S. Cl.
 CPC ........... *F16H 49/001* (2013.01); *F16H 57/08* (2013.01); *F16H 2049/003* (2013.01); *F16H 2057/085* (2013.01)

(58) Field of Classification Search
 CPC .. F16H 49/001; F16H 57/08; F16H 2057/085; F16H 2049/003
 See application file for complete search history.

(56) References Cited

U.S. PATENT DOCUMENTS

| 5,061,227 A | * | 10/1991 | Fickelscher | ......... F04C 15/0065 475/170 |
| 8,888,374 B1 | * | 11/2014 | Nien | ...................... F16C 35/067 384/537 |
| 9,145,919 B2 | * | 9/2015 | Lee | .......................... F16C 33/58 |
| 9,377,096 B2 | * | 6/2016 | Hoshina | .............. F16C 33/4605 |
| 10,352,426 B2 | * | 7/2019 | Kobayashi | ............... F16H 55/18 |
| 11,028,915 B2 | * | 6/2021 | Handa | ................... F16H 57/021 |
| 2018/0187764 A1 | * | 7/2018 | Handa | ..................... F16C 33/38 |
| 2018/0266533 A1 | * | 9/2018 | Tamura | ................. F16H 49/001 |

FOREIGN PATENT DOCUMENTS

| JP | 2015190488 A | * | 11/2015 | .......... F16H 49/001 |
| JP | 2019-105314 A | | 6/2019 | |
| KR | 20130098835 A | * | 9/2013 | |
| KR | 20160001343 A | * | 1/2016 | |

* cited by examiner

*Primary Examiner* — Sherry L Estremsky
(74) *Attorney, Agent, or Firm* — Michael Best & Friedrich LLP (57) ABSTRACT

A bending meshing type gear device includes a wave generator; an external gear that is disposed on an outer periphery of the wave generator, and is bendably deformed as the wave generator rotates; a first internal gear meshing with the external gear; a second internal gear that is disposed on one side in an axial direction of the first internal gear to mesh with the external gear; and a wave generator bearing that is disposed between the external gear and the wave generator in a state where movement in the axial direction of the wave generator bearing is restricted. The external gear includes a protrusion on an inner periphery of the external gear. The protrusion engages with the wave generator bearing to restrict movement in the axial direction of the external gear.

14 Claims, 5 Drawing Sheets

BENDING MESHING TYPE GEAR DEVICE

RELATED APPLICATIONS

The content of Japanese Patent Application No. 2019-194964, on the basis of which priority benefits are claimed in an accompanying application data sheet, is in its entirety incorporated herein by reference.

BACKGROUND

Technical Field

A certain embodiment of the invention relates to a bending meshing type gear device.

Description of Related Art

There is known a bending meshing type gear device including an external gear that is bendably deformed as a wave generator rotates, and a first internal gear and a second internal gear that mesh with the external gear. The first internal gear and the second internal gear are arranged side by side in an axial direction. In such a bending meshing type gear device, torques are applied to the external gear from the first internal gear and the second internal gear in different directions, and thus the external gear is twisted, and thrust force is exerted on the external gear.

The related art illustrates a configuration where in the bending meshing type gear device including the external gear, the first internal gear, and the second internal gear, restriction members that restrict movement in the axial direction of the external gear are disposed on both sides in the axial direction of the external gear.

SUMMARY

According to an embodiment of the invention, there is provided a bending meshing type gear device including: a wave generator; an external gear that is disposed on an outer periphery of the wave generator, and is bendably deformed as the wave generator rotates; a first internal gear meshing with the external gear; and a second internal gear that is disposed on one side in an axial direction of the first internal gear to mesh with the external gear. The bending meshing type gear device further includes a wave generator bearing that is disposed between the external gear and the wave generator in a state where movement in the axial direction of the wave generator bearing is restricted. The external gear includes a protrusion on an inner periphery of the external gear. The protrusion engages with the wave generator bearing to restrict movement in the axial direction of the external gear.

BRIEF DESCRIPTION OF THE DRAWINGS

FIGS. 3A and 3B are views illustrating an external gear.

DETAILED DESCRIPTION

As in the related art, when the movement in the axial direction of the external gear is restricted by the restriction members, friction in a circumferential direction is generated between the external gear and the restriction members.

It is desirable to provide a bending meshing type gear device capable of restricting movement in an axial direction of an external gear and capable of suppressing generation of friction in the external gear due to the restriction.

Hereinafter, an embodiment of the invention will be described in detail with reference to the drawings.

Basic Configuration

Figure 1:
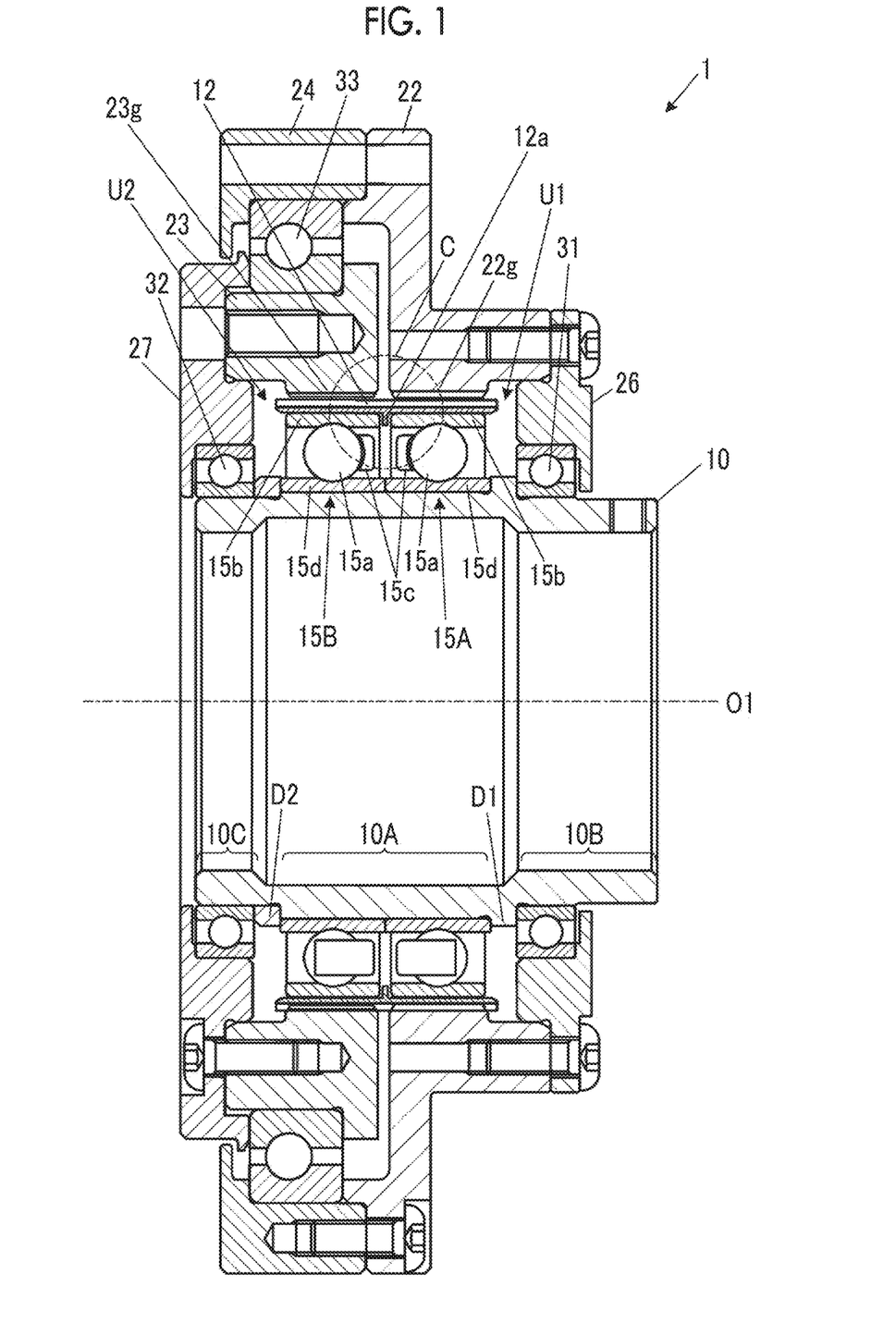
FIG. 1 is a cross-sectional view illustrating a bending meshing type gear device according to an embodiment of the invention.
Figure 2:
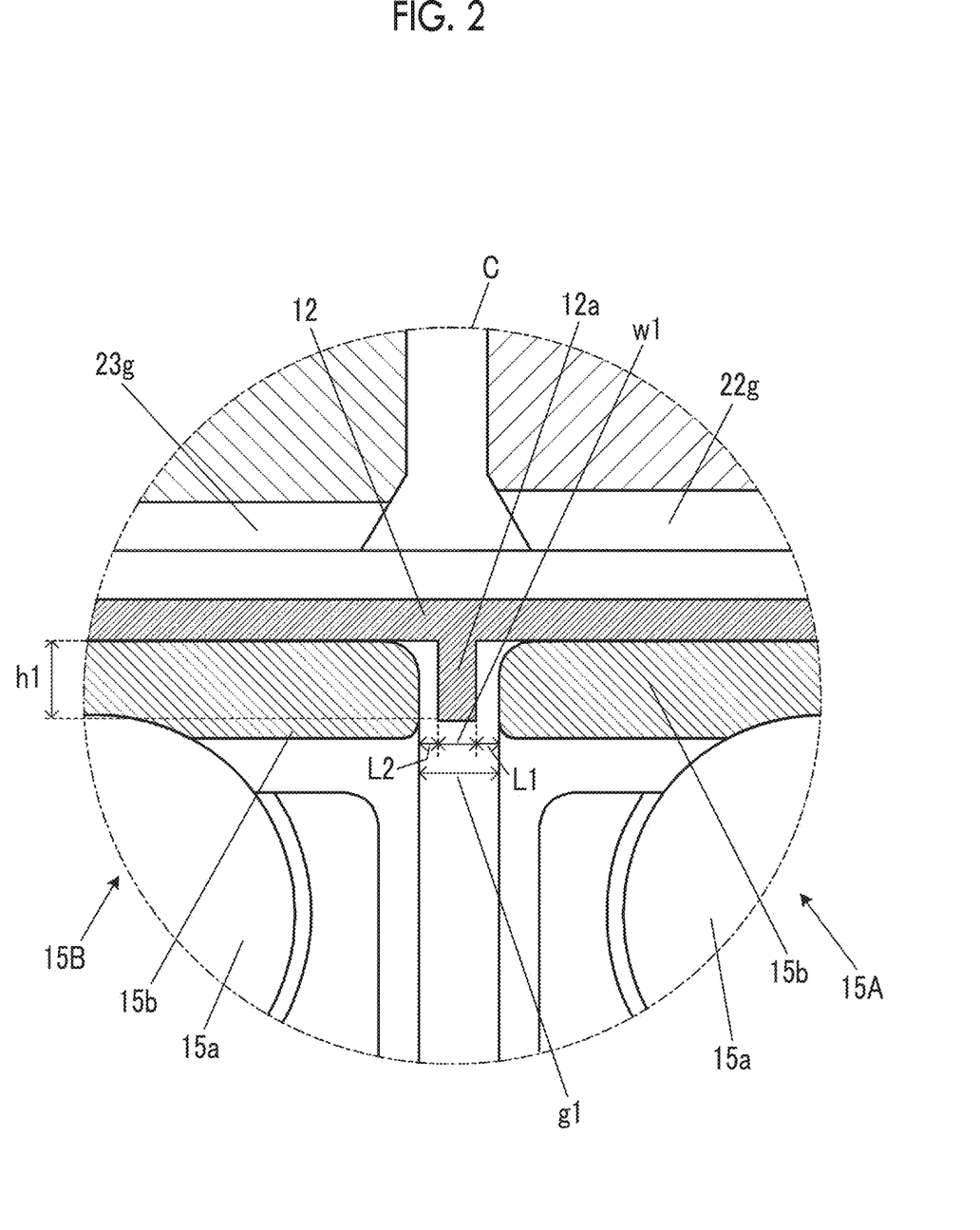
FIG. 2 is an enlarged view illustrating a part of FIG. 1.

FIG. 1 is a cross-sectional view illustrating a bending meshing type gear device according to the embodiment of the invention. FIG. 2 is an enlarged view illustrating a part of FIG. 1. In this specification, a direction along a rotation axis O1 is defined as an axial direction, a direction perpendicular to the rotation axis O1 is defined as a radial direction, and a rotational direction around the rotation axis O1 is defined as a circumferential direction.

As illustrated in FIG. 1, a bending meshing type gear device 1 according to the embodiment of the invention includes a wave generator shaft 10, an external gear 12 to be bendably deformed by the wave generator shaft 10, a first internal gear 22g and a second internal gear 23g that mesh with the external gear 12, and wave generator bearings 15A and 15B. Furthermore, the bending meshing type gear device 1 includes a first casing 22, a second internal gear member 23 including the second internal gear 23g, a second casing 24, a first cover 26, a second cover 27, bearings 31 and 32, and a main bearing 33.

The wave generator shaft 10 has a hollow shaft shape, and includes a wave generator 10A having an elliptical external shape in a cross section perpendicular to the rotation axis O1, and shaft portions 10B and 10C that are provided both sides in the axial direction of the wave generator 10A and have a circular external shape in a cross section perpendicular to the rotation axis O1. The elliptical shape is not required to be a geometrically exact ellipse, and includes a substantially ellipse. The wave generator shaft 10 rotates around the rotation axis O1, and the center of a cross section of the wave generator 10A, which is perpendicular to the rotation axis O1, coincides with the rotation axis O1.

The external gear 12 is a flexible cylindrical metal, and teeth are provided on an outer periphery of the external gear 12.

The wave generator bearing 15A (corresponding to a first wave generator bearing) is disposed between the wave generator 10A and the external gear 12. The wave generator bearing 15A includes a plurality of rolling elements (rollers) 15a, an outer ring 15b, a holder 15c that holds the plurality of rolling elements 15a, and an inner ring 15d. Incidentally, the wave generator bearing 15A may not include the outer ring 15b, and the plurality of rolling elements 15a may be configured to roll on an inner peripheral surface of the external gear 12, which serves as a raceway surface on an outer peripheral side. The other wave generator bearing 15B (corresponding to a second wave generator bearing) is the same as the wave generator bearing 15A.

Two wave generator bearings 15A and 15B are disposed side by side in the axial direction. The two wave generator bearings 15A and 15B are disposed to correspond to one range and the other range with respect to the center of the external gear 12 in the axial direction, namely, are disposed on an inner peripheral side of the one range and an inner peripheral side of the other range, respectively.

One of the first internal gear 22g and the second internal gear 23g meshes with one tooth portion of the external gear 12 with respect to the center of the external gear 12 in the axial direction, and the other meshes with the other tooth portion of the external gear 12 with respect to the center of the external gear 12 in the axial direction.

The first casing 22 and the second casing 24 are connected to each other to cover the outside in the radial direction of the first internal gear 22g, the second internal gear 23g, and the external gear 12. Internal teeth are provided in a part of an inner peripheral portion of the first casing 22 to form the first internal gear 22g.

A tooth portion is provided in apart of an inner peripheral portion of the second internal gear member 23 to form the second internal gear 23g.

The main bearing 33 is disposed between the second internal gear member 23 and the second casing 24. The second casing 24 rotatably supports the second internal gear member 23 via the main bearing 33.

The first cover 26 is connected to the first casing 22 to cover a meshing portion between the external gear 12 and the first internal gear 22g and the wave generator bearing 15A from one side (counter load side) of the axial direction.

The second cover 27 is connected to the second internal gear member 23 to cover a meshing portion between the external gear 12 and the second internal gear 23g and the wave generator bearing 15B from one side (load side) of the axial direction. The second cover 27 and the second internal gear member 23 are connected to a driven member that is a load. A second cover 27 side in the axial direction is called the "load side" and an opposite side is called the "counter load side".

The bearing 31 is disposed between the shaft portion 10B on the counter load side of the wave generator shaft 10 and the first cover 26. The bearing 32 is disposed between the shaft portion 10C on the load side of the wave generator shaft 10 and the second cover 27. The first cover 26 and the second cover 27 rotatably support the wave generator shaft 10 via the bearings 31 and 32.

Description of Operation of Basic Configuration

When power is transmitted from the outside to rotate the wave generator shaft 10, the motion of the wave generator 10A is transmitted to the external gear 12. In this case, the external gear 12 is restricted by a shape along an outer peripheral surface of the wave generator 10A, and is bent into an elliptical shape having a long axis portion and a short axis portion as seen in the axial direction. Furthermore, the long axis portion of the external gear 12 meshes with the first internal gear 22g that is fixed. For this reason, the external gear 12 does not rotate at the same rotational speed as the wave generator 10A, but the wave generator 10A relatively rotates inside the external gear 12. Along with the relative rotation, the external gear 12 is bendably deformed such that a long axis position and a short axis position move in the circumferential direction. The period of the deformation is proportional to the rotation period of the wave generator shaft 10.

When the external gear 12 is bendably deformed, since the long axis position of the external gear 12 moves, the meshing position between the external gear 12 and the first internal gear 22g is changed in the rotational direction. Here, when it is assumed that the number of teeth of the external gear 12 is 100 and the number of teeth of the first internal gear 22g is 102, whenever the meshing position makes one revolution, the meshing teeth of the external gear 12 and the first internal gear 22g are shifted, and thus the external gear 12 rotates (spins). When the numbers of teeth are as described above, the rotary motion of the wave generator shaft 10 is reduced at a reduction ratio of 100:2, and the reduced rotary motion is transmitted to the external gear 12.

Meanwhile, since the external gear 12 also meshes with the second internal gear 23g, the meshing position between the external gear 12 and the second internal gear 23g is also changed in the rotational direction by the rotation of the wave generator shaft 10. Here, when the number of teeth of the second internal gear 23g and the number of teeth of the external gear 12 are the same, the external gear 12 and the second internal gear 23g do not rotate relative to each other, and the rotary motion of the external gear 12 is transmitted to the second internal gear 23g at a reduction ratio of 1:1. As a result, the rotary motion of the wave generator shaft 10 is reduced at a reduction ratio of 100:2, and the reduced rotary motion is transmitted to the second internal gear member 23 and the second cover 27 to be output to the driven member.

Movement Restriction Structure of External Gear

Figure 3A:
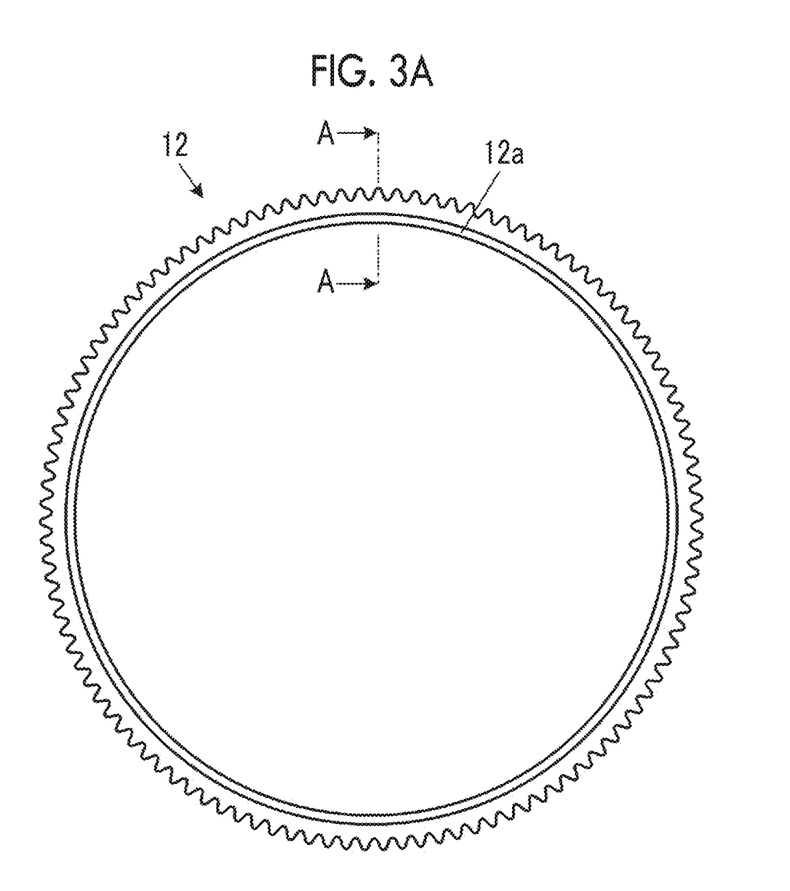
FIG. 3A is a view seen in an axial direction.
Figure 3B:
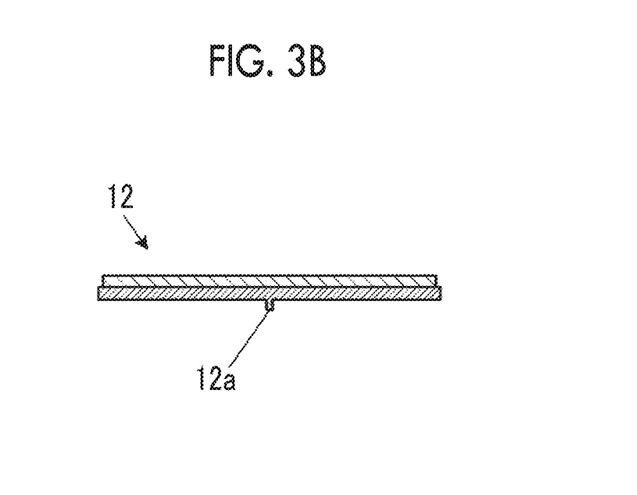
FIG. 3B is a cross-sectional view taken along a line A-A.

FIGS. 3A and 3B are views illustrating the external gear, FIG. 3A is a view seen in the axial direction, and FIG. 3B is a cross-sectional view taken along a line A-A.

As illustrated in FIGS. 2 and 3, the external gear 12 includes a protrusion 12a on an inner periphery thereof. In one embodiment, the protrusion 12a continues over the entire periphery in the circumferential direction. The protrusion 12a is disposed at one location (for example, the center) in the axial direction of the external gear 12. The protrusion 12a is integrally formed with the external gear 12 as a single member.

The wave generator bearings 15A and 15B are externally fitted to the wave generator 10A such that the movement in the axial direction of the wave generator bearings 15A and 15B is restricted. As a specific example, the inner ring 15d of one wave generator bearing 15A is in contact with an outer peripheral step portion (the outer peripheral step portion (corresponding to an inner ring restriction member) D1 of the wave generator shaft 10 from the load side. In addition, the inner ring 15d of the other wave generator bearing 15B is in contact with the inner ring 15d of the one wave generator bearing 15A from the load side. Furthermore, a stopper ring (corresponding to an inner ring restriction member) D2 is in contact with the inner ring 15d of the wave generator bearing 15B from the load side. The stopper ring D2 is fixed to the wave generator shaft 10. Incidentally, the stopper ring D2 may not be fixed to the wave generator shaft 10, and for example, a gap may be provided between an inner periphery of the stopper ring D2 and the wave generator shaft 10 in the radial direction. With the structure, the movement in the axial direction of two inner rings 15d and 15d, namely, the movement in the axial direction of the two wave generator bearings 15A and 15B is restricted. Incidentally, instead of the outer peripheral step portion D1, the stopper ring may be provided in the wave generator shaft 10. In addition, the two inner rings 15d and 15d may be press-fitted into the wave generator 10A, so that the movement in the axial direction of the two inner rings 15d and 15d is restricted. The concept of the stopper ring includes retaining rings such as a C-ring and an E-ring.

A gap g1 (refer to FIG. 2) is provided in at least an outer peripheral portion between the outer ring 15b of the one wave generator bearing 15A and the outer ring 15b of the other wave generator bearing 15B.

The protrusion 12a of the external gear 12 is located in the gap g1. As a result, one side and the other side in the axial direction of the protrusion 12a are blocked by the outer rings 15b and 15b, so that the movement in the axial direction of the protrusion 12a is restricted.

The gap g1 between the outer rings 15b and 15b is larger than a width w1 in the axial direction of the protrusion 12a, and as a result, gaps L1 and L2 are provided between the outer rings 15b and 15b and the protrusion 12a. When the external gear 12 and the protrusion 12a move slightly in the axial direction, the width of each of the gaps L1 and L2 is changed; however, the total width of two gaps L1 and L2 is not changed. The total width of the two gaps L1 and L2 is set to a length such that even when the rated torque (maximum torque) is applied to the bending meshing type gear device 1 in a stationary state, the protrusion 12a does not come into contact with any one of one outer ring 15b and the other outer ring 15b. Namely, when the above rated torque is applied, the external gear 12 is twist deformed or inclined, a part of the entire periphery of the protrusion 12a is displaced to one side of the axial direction, and the other portion is displaced to the other side of the axial direction. However, due to the above setting of the widths of the gaps L1 and L2, both of a portion most displaced to the one side of the axial direction and a portion most displaced to the other side of the axial direction are suppressed from coming into contact with the one outer ring 15b and the other outer ring 15b to press the protrusion 12a.

A space U1 (refer to FIG. 1) is provided between one end on the counter load side of the external gear 12 and the first cover 26. A space U2 (refer to FIG. 1) is provided between one end on the load side of the external gear 12 and the second cover 27. The one end on the counter load side and the one end on the load side of the external gear 12 do not come into contact with other members during operation of the bending meshing type gear device 1 due to the spaces U1 and U2.

Figure 4:
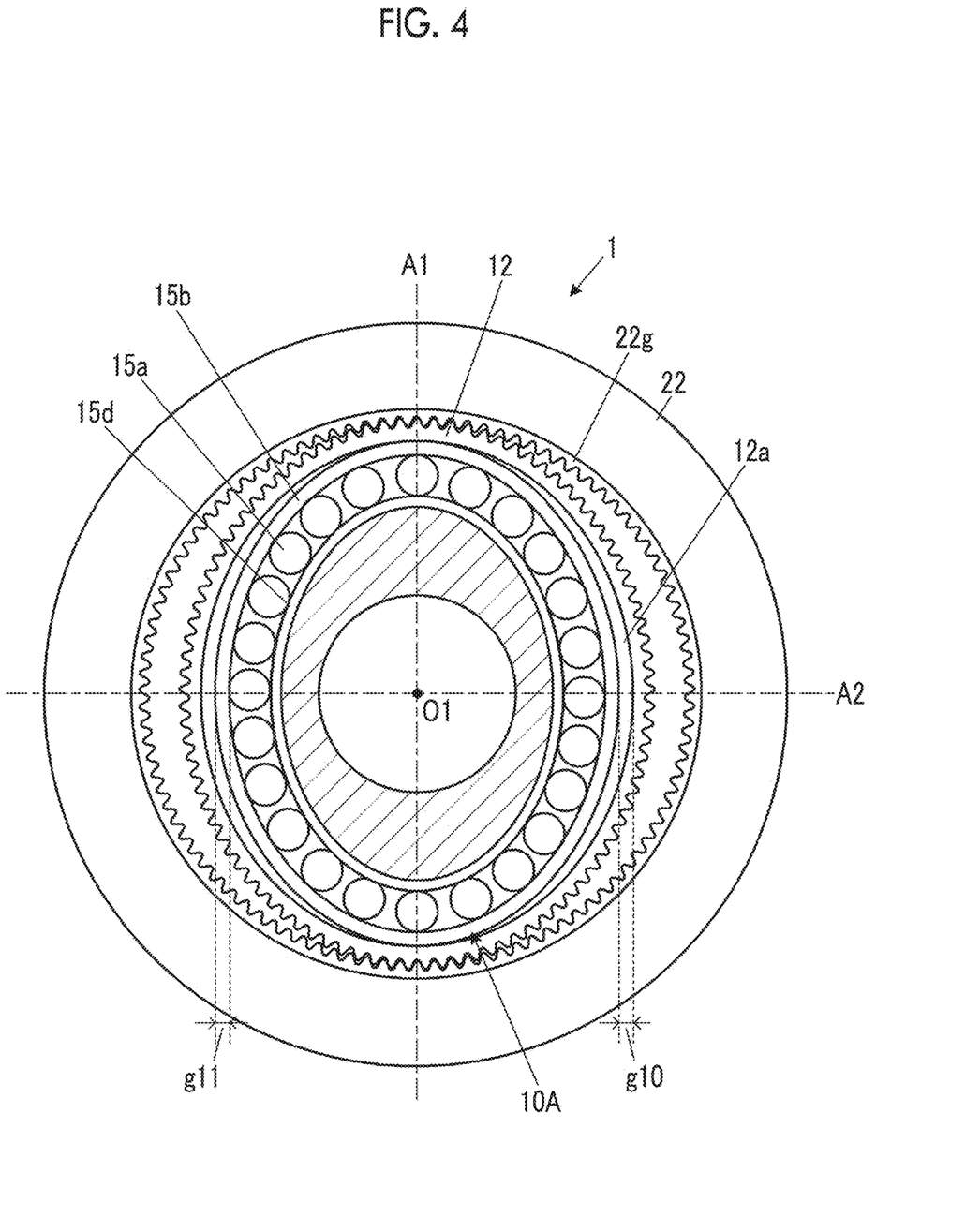
FIG. 4 is a view describing gaps between the external gear and wave generator bearings at a short axis position.

FIG. 4 is a view describing gaps between the external gear and the wave generator bearings at the short axis position.

The wave generator 10A and the wave generator bearings 15A and 15B are disposed on the inner peripheral surface of the external gear 12, so that the external gear 12 is bendably deformed into a shape (for example, elliptical shape) having a long axis A1 and a short axis A2 as seen in the axial direction. Furthermore, since long axis A1 portions of the external gear 12 mesh with the first internal gear 22g and the second internal gear 23g, gaps g10 and g11 are formed between short axis A2 portions of the external gear 12 and the wave generator bearings 15A and 15B.

A height h1 (refer to FIG. 2) of the protrusion 12a of the external gear 12 is larger than the size (width in the radial direction) of each of the gaps g10 and g11. Since the height h1 of the protrusion 12a is set as described above, the protrusion 12a overlaps the outer rings 15b and 15b at the long axis A1 position and the short axis A2 position when seen in the axial direction. As a result, an occurrence of a situation where the protrusion 12a and the outer rings 15b are caught on each other to prevent smooth operation of the bending meshing type gear device 1 can be suppressed.

Description of Operation Related to Protrusion

During operation of the bending meshing type gear device 1, even when force is applied to the external gear 12 in the axial direction, the protrusion 12a of the external gear 12 engages with the wave generator bearings 15A and 15B. Specifically, the protrusion 12a comes into contact with one of two outer rings 15b and 15b. As a result, the external gear 12 is suppressed from being greatly shifted in the axial direction. Since the protrusion 12a and the outer rings 15b and 15b of the wave generator bearings 15A and 15B rotate at substantially the same speed, there is no relative motion in the circumferential direction therebetween, and large friction is suppressed from being generated therebetween.

Furthermore, when torque is applied between the wave generator shaft 10 to which power is input and the second internal gear member 23 and the second cover 27 which output power, torque is generated between the first internal gear 22g and the second internal gear 23g, and thus the external gear 12 is twisted. When the external gear 12 is twist deformed, the range of a part in the circumferential direction of the protrusion 12a is displaced to the one side of the axial direction, and the other range in the circumferential direction is displaced to the other side of the axial direction. However, since the gaps L1 and L2 are set between the outer rings 15b and 15b and the protrusion 12a, even when the maximum torque is applied to cause the external gear 12 to be twist deformed maximum, the protrusion 12a is suppressed from coming into contact with both of the outer rings 15b and 15b. As a result, an occurrence of a situation where the protrusion 12a is pressed from both sides in the axial direction so that large stress is generated at the root of the protrusion 12a can be suppressed.

In addition, during operation of the bending meshing type gear device 1, the gaps g10 and g11 are formed between the external gear 12 and the outer rings 15b of the wave generator bearings 15A and 15B at the short axis A2 position. However, it is maintained that when seen in the axial direction, the protrusion 12a having the height h1 overlaps the wave generator bearings 15A and 15B (for example, the outer rings 15b) even at the short axis A2 position where the gaps g10 and g11 (FIG. 4) are formed. Therefore, the outer rings 15b and the protrusion 12a are not caught on each other, and smooth operation of the bending meshing type gear device 1 is realized.

As described above, according to the bending meshing type gear device 1 of the present embodiment, since the external gear 12 includes the protrusion 12a on the inner periphery thereof, and the protrusion 12a engages with the wave generator bearings 15A and 15B, the movement in the axial direction of the external gear 12 can be restricted. Furthermore, since relative motion in the rotational direction between the protrusion 12a and the wave generator bearings 15A and 15B is not large, large friction is suppressed from being generated in the rotational direction therebetween. The generation of abrasion powder or the like can be suppressed by the suppression of the friction.

Furthermore, according to the bending meshing type gear device 1 of the present embodiment, the height h1 of the protrusion 12a is set such that the protrusion 12a and the wave generator bearings 15A and 15B overlap each other at the short axis A2 position of the wave generator 10A when seen in the axial direction. Therefore, when the protrusion 12a is fluctuated with respect to the wave generator bearings 15A and 15B in the radial direction due to bending deformation of the external gear 12, the protrusion 12a is not caught on the wave generator bearings 15A and 15B, and smooth operation can be realized.

Furthermore, according to the bending meshing type gear device 1 of the present embodiment, the two wave generator bearings 15A and 15B are provided, and the protrusion 12a is located between the two wave generator bearings 15A and 15B. Therefore, when the bending meshing type gear device 1 is assembled, the assembly where the movement in the axial direction of the protrusion 12a is restricted can be easily realized.

Furthermore, according to the bending meshing type gear device 1 of the present embodiment, when torque is not applied, the gaps L1 and L2 (refer to FIG. 2) that are widened in the axial direction are provided between the protrusion 12a and the wave generator bearings 15A and 15B. Therefore, even when torque is applied to cause the external gear 12 to be twist deformed, an occurrence of a situation where the protrusion 12a is pressed so that excessive stress is generated at the root or the like of the protrusion 12a can be suppressed.

Modification Example

Figure 5:
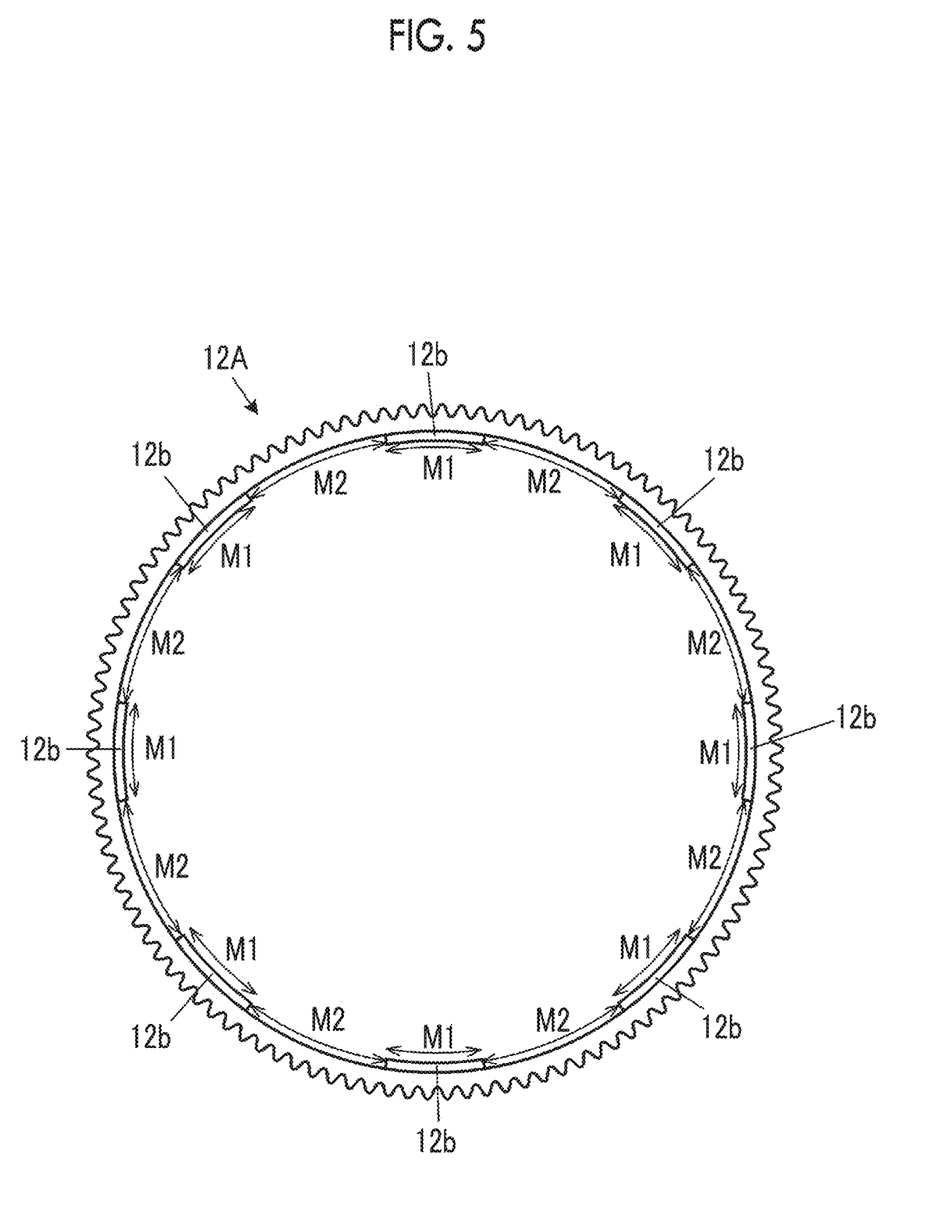
FIG. 5 is a view illustrating a modification example of a protrusion of the external gear.

FIG. 5 is a view illustrating a modification example of the protrusion of the external gear.

An external gear 12A of the modification example includes a plurality of protrusions 12b on an inner periphery thereof. The plurality of protrusions 12b are provided at the same position in the axial direction and at different positions in the circumferential direction. The plurality of protrusions 12b may be disposed at equal intervals along the circumferential direction with gaps therebetween. A width M1 in the circumferential direction of the protrusion 12b is smaller than a width M2 of the gap. The position in the axial direction, the height, and the width in the axial direction of each of the plurality of protrusions 12b may be the same as those of the protrusion 12a of the one embodiment. Namely, the plurality of protrusions 12b are arranged in the circumferential direction with gaps therebetween, and the sum of the lengths (outer diameter) in the circumferential direction of the plurality of protrusions 12b may be smaller than the sum of the lengths in the circumferential direction (lengths at the position corresponding to the outer diameter of the protrusion 12b) of the gaps.

According to the bending meshing type gear device 1 to which the external gear 12A of the modification example is applied, since the plurality of protrusions 12b are provided with gaps therebetween, the reaction force of the protrusions 12b against bending deformation of the external gear 12A is decreased. Therefore, the loss of the bending meshing type gear device 1 caused by the reaction force of the protrusions 12b can be reduced. Furthermore, since the width M2 in the circumferential direction of the gap is larger than the width M1 in the circumferential direction of the protrusion 12b, the reaction force of the protrusions 12b against bending deformation of the external gear 12A can be further reduced.

The embodiment of the invention has been described above. However, the embodiment of the invention is not limited to the above embodiment. For example, a configuration where the protrusions of the external gear are provided at two locations in the axial direction and two protrusions interpose the wave generator bearing (for example, outer ring) therebetween to restrict the movement in the axial direction of the external gear may be adopted. One or a plurality of the wave generator bearings interposed between the two protrusions may be provided. Instead of the two protrusions, one protrusion and one C-ring or the like may be applied. In addition, in the above embodiments, the configuration including the two wave generator bearings is illustrated; however, a configuration including one or three or more wave generator bearings may be adopted. In addition, in place of the configuration where the protrusion of the external gear is interposed between the outer rings of the two wave generator bearings as illustrated in the embodiments, one outer ring may be provided with a recessed portion with which the protrusion is engaged. In addition, the above embodiments illustrate the example where the tooth portion and a base body of the external gear and the protrusion are integrally formed as a single member. However, a configuration where the protrusion, and the tooth portion and the base body of the external gear are formed as separate bodies to be assembled together may be adopted. For example, the external gear including the protrusion may be configured such that the protrusion is formed of a C-shaped ring, a groove to which the C-shaped ring is fitted is provided on an inner peripheral side of the base body of the external gear, and both are assembled. When the protrusion is formed of a C-shaped ring, the external gear is configured such that the protrusion is partially cut off in the circumferential direction.

In addition, in the above embodiments, the configuration where the protrusion of the external gear engages with the outer ring of the wave generator bearing is illustrated. However, the wave generator bearing may not include the outer ring, and the protrusion of the external gear may engage with the rolling elements or the holder (retainer) of the rolling elements of the wave generator bearing to restrict the movement in the axial direction of the external gear. In addition, the details illustrated in the embodiments may be appropriately changed without departing from the spirit of the invention.

It should be understood that the invention is not limited to the above-described embodiment, but may be modified into various forms on the basis of the spirit of the invention. Additionally, the modifications are included in the scope of the invention.

What is claimed is:

1. A bending meshing type gear device comprising:
    a wave generator;
    an external gear that is disposed on an outer periphery of the wave generator, and is bendably deformed as the wave generator rotates;
    a first internal gear meshing with the external gear; and
    a second internal gear that is disposed on one side in an axial direction of the first internal gear to mesh with the external gear,
    wherein the bending meshing type gear device further comprises a wave generator bearing that is disposed between the external gear and the wave generator in a state where movement in the axial direction of the wave generator bearing is restricted,
    the wave generator bearing includes a first rolling element and a second rolling element that is arranged side by side with the first rolling element in the axial direction,
    the external gear includes a protrusion on an inner periphery of the external gear,
    the protrusion is located between the first rolling element and the second rolling element in the axial direction, and
    the protrusion engages with the wave generator bearing to restrict movement in the axial direction of the external gear.

2. The bending meshing type gear device according to claim 1,
    wherein the protrusion and the wave generator bearing overlap each other at a short axis position of the wave generator when seen in the axial direction.

3. The bending meshing type gear device according to claim 1,
    wherein the wave generator bearing includes a first wave generator bearing and a second wave generator bearing that are arranged in the axial direction, and
    the protrusion is located between the first wave generator bearing and the second wave generator bearing.

4. The bending meshing type gear device according to claim 1,
wherein the wave generator bearing includes an inner ring, and
the bending meshing type gear device further comprises an inner ring restriction member that restricts movement in the axial direction of the inner ring.

5. The bending meshing type gear device according to claim 1,
wherein a plurality of the protrusions are arranged in a circumferential direction with gaps between the plurality of protrusions.

6. The bending meshing type gear device according to claim 5,
wherein a sum of lengths in the circumferential direction of the plurality of protrusions is smaller than a sum of lengths in the circumferential direction of the gaps.

7. The bending meshing type gear device according to claim 1,
wherein when torque is not applied between the wave generator and the first internal gear, a gap that has a width in the axial direction is provided between the protrusion and the wave generator bearing.

8. The bending meshing type gear device according to claim 1,
wherein the external gear includes a first external tooth that meshes with the first internal gear and a second external tooth that meshes with the second internal gear, and
the first external tooth and the second external tooth are integrally formed.

9. The bending meshing type gear device according to claim 1,
wherein the external gear includes a base portion on which the protrusion is formed, a first external tooth formed radially outside the base portion and meshing with the first internal gear, and a second external tooth meshing the second internal gear, and
an outer diameter of the base portion is constant.

10. The bending meshing type gear device according to claim 1,
wherein the protrusion engages with an outer ring of the wave generator bearing to restrict movement of the external gear to both sides of the axial direction.

11. The bending meshing type gear device according to claim 10, further comprising:
a first cover provided on one side of the external gear in the axial direction; and
a second cover provided on the other side of the external gear in the axial direction,
wherein a first space is provided between the external gear and the first cover,
a second space is provided between the external gear and the second cover,
a gap is provided between the outer ring and the protrusion, and
a sum of axial lengths of the first space and the second space is greater than an axial length of the gap.

12. The bending meshing type gear device according to claim 11,
wherein the external gear does not come into contact with the first cover and the second cover.

13. The bending meshing type gear device according to claim 10,
wherein the wave generator bearing includes a first outer ring and a second outer ring for the first and second rolling elements, respectively, and
the protrusion is interposed between the first outer ring and the second outer ring of the wave generator bearing to restrict movement of the external gear to both sides of the axial direction.

14. The bending meshing type gear device according to claim 1,
wherein an axial length of an outer ring of the wave generator bearing is smaller than an axial length of an inner ring of the wave generator bearing.

* * * * *